United States Patent
Welch et al.

(10) Patent No.: US 11,458,405 B1
(45) Date of Patent: Oct. 4, 2022

(54) SYSTEMS AND METHODS FOR CHEAT DETECTION IN ELECTRONIC GAMES

(71) Applicant: Microsoft Technology Licensing, LLC, Redmond, WA (US)

(72) Inventors: Nathan Henry Welch, Smyrna, GA (US); Donald Frank Brinkman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/246,074

(22) Filed: Apr. 30, 2021

(51) Int. Cl.
  *A63F 13/00* (2014.01)
  *A63F 13/75* (2014.01)
  *A63F 13/35* (2014.01)
  *H04L 67/131* (2022.01)

(52) U.S. Cl.
  CPC .............. *A63F 13/75* (2014.09); *A63F 13/35* (2014.09); *H04L 67/131* (2022.05)

(58) Field of Classification Search
  CPC ............. G07F 17/3225; G07F 17/3262; G07F 17/3295; G07F 17/3279; G07F 17/3272; A63F 13/798
  See application file for complete search history.

(56) References Cited

U.S. PATENT DOCUMENTS

| 9,147,314 B2 * | 9/2015 | Muir | G07F 17/3227 |
| 2006/0128460 A1 * | 6/2006 | Muir | G07F 17/323 463/16 |
| 2008/0020848 A1 * | 1/2008 | Muir | G07F 17/3262 463/42 |

OTHER PUBLICATIONS

"Watch For", Retrieved From: https://web.archive.org/web/20191112091206/https://www.microsoft.com/en-us/garage/wall-of-fame/watch-for/, Nov. 12, 2019, 7 Pages.

* cited by examiner

*Primary Examiner* — Omkar A Deodhar
*Assistant Examiner* — Eric M Thomas
(74) *Attorney, Agent, or Firm* — Ray Quinney & Nebeker P.C.; John O. Carpenter

(57) ABSTRACT

A method, at a server computer, for verifying the results of an electronic game includes obtaining a unique identifier from a client device running a game application. The server computer then receives, from the client device, video information in a real-time video stream. The video information is evaluated at the server computer using a machine learning model to identify a virtual object in a first frame of the video information and identify the virtual object in a second frame of the video information. The method also includes determining a change in the virtual object between the first frame and the second frame and comparing the change to one or more rules of a ruleset. The method includes determining a legality of the change in the virtual object based at least partially on the ruleset. If an illegal event is identified, the change is presented to a moderator for review.

20 Claims, 7 Drawing Sheets

SYSTEMS AND METHODS FOR CHEAT DETECTION IN ELECTRONIC GAMES

BACKGROUND

Background and Relevant Art

Computing devices based on retail commodity hardware have limited resources, most of which are dedicated to running the game application. Even general-purpose computing devices used to run game applications can dedicate most, if not all, available computing resources to running the game application. Comparatively little computing resources remain for cheat detection and verification of results in a competitive setting.

BRIEF SUMMARY

In some embodiments, electronic games are played competitively both online and offline. The integrity of competitions can be compromised by users playing on modified game applications, by using exploits (unintended errors in the game application), or by using intervening mod applications that alter inputs or outputs from the game application. Monitoring the video information output by the game application and client device using machine vision algorithms and machine learning systems can identify and report suspicious or illegal activity without requiring a moderator to view every moment of every match, or to identify and report suspicious or illegal activity that would be difficult or impossible for a human moderator to identify, such as modified frame data in a competitive fighting game or cumulative improbabilities over the course of a speed run.

In some embodiments, a method, at a server computer, for verifying the results of an electronic game includes obtaining a unique identifier from a client device running a game application. The server computer then receives, from the client device, video information produced by the game application in a real-time video stream or another screen sharing protocol. The video information is then evaluated at the server computer using machine vision and a machine learning model to identify a virtual object in a first frame of the video information and identify the virtual object in a second frame of the video information. The method also includes determining a change in the virtual object between the first frame and the second frame and comparing the change to one or more rules of a ruleset. The method includes determining a legality of the change in the virtual object based at least partially on the ruleset. If an illegal or otherwise anomalous event is identified, the change is presented to a moderator for review.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a first frame of video information used to verify the results of a competitive electronic game, according to at least some embodiments of the present disclosure;

FIG. 2-2 is a second frame of video information used to verify the results of a competitive electronic game, according to at least some embodiments of the present disclosure;

DETAILED DESCRIPTION

Figure 1:
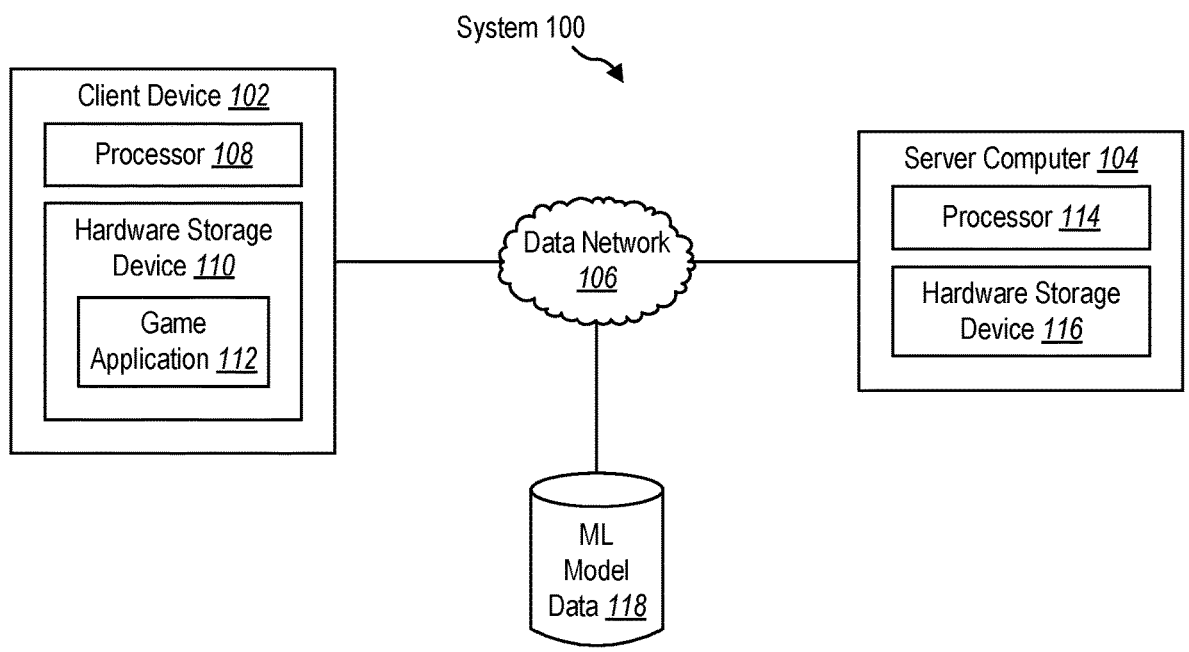
FIG. 1 is a schematic representation of a system for verifying the results of a competitive electronic game, according to at least some embodiments of the present disclosure.

The present disclosure relates generally to systems and methods for allowing interaction with a game application. Systems and methods described herein allow for automatic detection and reporting of cheats, exploits, data manipulation, rule violations, or other anomalous events in electronic gaming. For example, competitive games, such as eSports tournaments, may include anti-cheating measures in both software and human moderation, but some cheats may be sufficiently sophisticated that conventional moderation fails to identify the cheating or other undesired behavior. In some embodiments of systems and methods according to the present disclosure, video information is evaluated to detect objects and events using machine vision. The detected objects and events are then compared against a ruleset to determine the legality of the event.

In some embodiments, the ruleset is created by a machine learning system through training datasets. For example, a machine learning system may evaluate many events to determine correlations between events across many video streams or recordings. In some embodiments, the ruleset is a predetermined ruleset based on the game engine of the game application to inform the system what events are possible or impossible in the game engine. For example, the ruleset may indicate that a player avatar passing through a wall is not an allowed event in the game, which in turn indicates the player is cheating.

In some embodiments, the ruleset includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged.

In some embodiments, the ruleset includes probability tables that allow the detection of improbable events in the video information and/or game state data. For example, drop tables for a role-playing game may control the probability that a game engine provides a particular item to the player avatar in the game environment. If an item has a drop rate of 5.0%, a single detection of the item in the video information is non-anomalous. However, if the method or system described herein detects the item dropping 5 out of 20 chances (a 0.000000147% chance), the sequence may indicate a modified game engine and report the sequence of events to a moderator for review. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate an exploit in the game application. The ruleset may include threshold values to determine when to report an improbable event or sequence of events to a moderator for review. In some embodiments, a probability curve may be calculated based on the drop table or other probability table, and a threshold may be set at a standard deviation away from a most likely outcome. In another embodiment, the threshold may be set manually, such that a detected improbable event or sequence of events is reported when the occurrence exceeds the manually set threshold. As speedruns or other competitive submissions may exhibit a selection bias, moderators or officials setting the threshold may expect advantageous results to be submitted.

In some embodiments, the ruleset includes a predetermined set of undesired events that, while allowable by the game engine and intended to be in the game, have been deemed illegal for a particular competition. For example, certain player avatar skins (graphical appearances) may be banned from some competitions. In another example, some competitions may require certain graphical settings for the game application running on a client device, as a reduction in graphical settings may remove environmental objects, lighting effects, or particle effects that should be standardized for all players. In such examples, the ruleset may be predetermined by competition officials to ensure the events of the gameplay meet competition requirements.

FIG. 1 is a schematic illustration of a system for verifying electronic gaming results. In some embodiments, the system 100 includes a client device 102 and a server computer 104 in communication via a data network 106. In some embodiments, the client device 102 is a computing device with a processor 108 and hardware storage device 110 in communication with the processor 108. In some embodiments, the hardware storage device 110 is any non-transient computer readable medium that may store instructions thereon. The hardware storage device 110 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 110 is local to and/or integrated with the client device 102. In some embodiments, the hardware storage device 110 is accessed by the client device 102 through a network connection.

The processor 108 may execute a game application 112 that is stored on the hardware storage device 110 to render video information at least partially in response to user inputs to the client device 102. In some embodiments, the client device 102 includes a display device to display the video information to a playing user. For example, the client device 102 may be a dedicated gaming console with an integrated display (e.g., NINTENDO SWITCH) or a general-purpose computer with an integrated display (e.g., a laptop computer). In some embodiments, the client device 102 is in communication with a display device to display the video information to a playing user. For example, the client device 102 may be a gaming console (e.g., MICROSOFT XBOX) that outputs the video information to a connected display device (e.g., a television) for display to a playing user.

In some embodiments, the video information or a portion of the video information is also transmitted to a server computer 104 via a data network 106. In some embodiments, the server computer 104 is located remotely from the client device 102 and the data network 106 is or includes the World Wide Web. For example, the client device 102 may be connected to the data network 106 via the playing user's home internet connection, and the server computer 104 may be located in a datacenter. In some embodiments, the server computer 104 is located locally to the client device 102 and the video information is transmitted over a local area network or a direct data connection. For example, a competitive electronic game tournament (e.g., an eSports competition) may have a local data network 106 to which all client devices 102 used for the competition are connected. A server computer 106 connected to the local data network 106 may communicate with the client devices 102 used for the competition.

The client device 102 executes a copy of the game application 112 to generate the video information. In some embodiments, the client device renders the video information in real-time. In some embodiments, at least a portion of the video information is pre-rendered. The video information includes information about the game environment and the actions of the playing user. By analyzing and evaluating the video information and/or game state data provided by the client device, the actions of the playing user and interactions of the playing user's avatar or player character in the game environment can be verified for integrity. The actions of the playing user and interactions of the playing user's avatar or player character in the game environment may be evaluated and compared against a ruleset to determine whether the playing user is adhering to pre-determined rules and/or whether the copy of the game application running on the client device has been modified. In some embodiments, one or more mod applications change inputs to or outputs from the game application, which may be detectable in the video information and/or game state data.

In at least one embodiment, a second client device is also in data communication with the data network and running a second copy of the game application, as will be described herein. For example, both the first client device and the second client device may be running copies of Halo: Combat Evolved. A game instance is a specific copy of a game application is that run by a client device, and the game instance may be interacted with while the game instance is active. In some examples, multiple users may interact with a single instance of a game application, such as two user playing cooperatively in Streets of Rage 4. In some examples, a first user may interact with a first instance of a game application and a second user may interact with a second instance of the same game application, such as a first user playing a first instance of Minecraft on a first client device while a second user plays a second instance of Minecraft on a second client device that is independent of the first instance of Minecraft. In some examples, a first user may interact with a first instance of a game application and a second user may interact with a second instance of the same game application while the first instance and second instance are communicating with one another, such as a first user playing a first instance of Super Smash Bros. while a second user races against the first user in a second instance of Super Smash Bros. that is communicating with the first instance of Super Smash Bros.

The video information and/or game state data provided by the first client device running a first game instance of the game application can be compared against that provided by the second client device running a second game instance of the game application communicating with the first game instance to detect variations in the output of the devices. Variations may indicate that one or both of the client devices are running modified copies of the game application.

In some embodiments, the server computer 104 receives the video information from the client device 102 via the data network 106. The server computer 104 includes a processor 114 and a hardware storage device 116 in data communication with the processor 114. The hardware storage device 116 has instructions stored thereon that, when executed by the processor 114, cause the server computer 104 to perform any of the methods described herein. For example, the server computer 104 may detect events in the video information to evaluate the video information for illegal or undesired behaviors.

In at least one embodiment, the server computer 104 includes or is in communication with a machine learning (ML) model that detects and/or reports events in the video information to evaluate the video information for illegal or undesired behaviors. In some embodiments, the server computer 104 has stored thereon (e.g., in the hardware storage device 116) a ML model that accesses and/or communicates with ML model data 118. In some examples, the ML model data is stored locally to the server computer. In some examples, the ML model data 118 is stored remotely from the server computer 104 and accessed by the server computer via the data network 106. For example, the ML model data 118 may be aggregated from and/or refined by a plurality of ML models executed by a plurality of server computers. The ML model data may be updated based on the outputs of the ML models, with the most current ML model data made available for the ML model running on the server computer 104 when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model. In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, the UI element indicating player avatar health may increase in value in response to the player avatar interacting with a health pack in the game environment.

In some embodiments, the ML system can create a ruleset of expected or correlated events in the video information. In a particular example, if the UI element indicating player avatar health increases in value without the player avatar interacting with a health pack, the ML model may tag the event as anomalous healing of the player avatar and report the event to a moderator for review. In other examples, the ML model may correlate a collision event for a first-person shooter game application with the position of the reticle at or near the center of the screen. If the player is shooting and hitting targets not coinciding with the position of the reticle, the ML model may tag the event as anomalous aiming (and potential use of a mod application, such as an aimbot) and report the event to a moderator for review.

An instance may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information. In some embodiments, a training dataset includes drop tables.

In some embodiments, systems and methods described herein obtain a training dataset and identify one or more labels of the instances of the training dataset to predict anomalous events based on a comparison of detected events against a ruleset. In some embodiments, the ruleset is predetermined. In some embodiments, the ruleset is developed and refined by the ML system by iterations of processing video information.

Figures 1, 2:
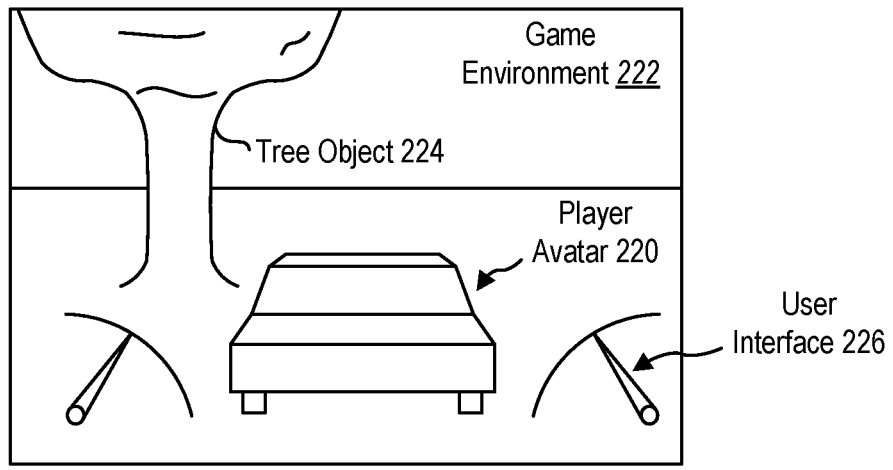
Figure 2:
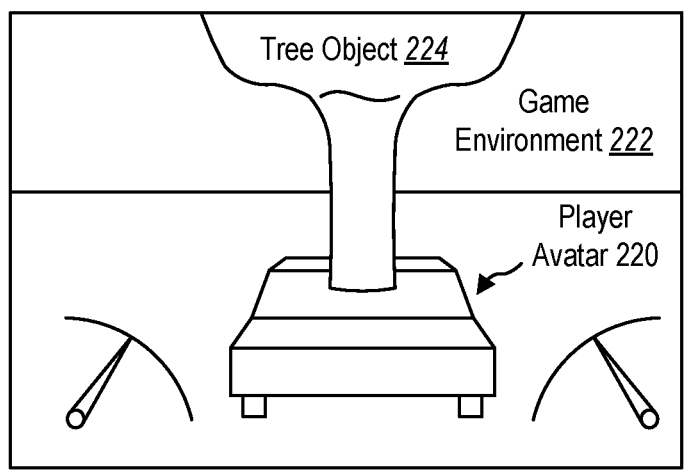

Systems and methods according to the present disclosure parse the video information by detecting objects in frames of the video information. In some embodiments, the objects include virtual objects positioned in the game environment, such as illustrated in FIGS. 2-1 and 2-2. The video information may reflect the player avatar 220, such as a car, moving within a three-dimensional or two-dimensional game environment 222, where the position of the virtual object 224 is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar relative to the overall game environment and/or depending on the movement of the virtual object relative to the game environment.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In FIG. 2-1, a frame of video information includes a tree object 224 positioned in the game environment 222 with the player avatar 220, in this case a car. Other objects in the frame include the user interface 226 which may be independent of the three-dimensional game environment 222. The machine vision may identify the position, size, and shape of the tree object 224 relative to the player avatar 220 to establish a baseline for the relative movement illustrated in the second frame of FIG. 2-2.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state. In some embodiments, the game state data is used to synchronize two instances of a game application to render the same game environment to two different users. In some embodiments, the game state data can present the game state of the first instance asynchronously to a second instance to allow the same or different user to experience the game state of the first instance at a later time.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system. In some embodiments, the game state data may be compared against the object detection to check for discrepancies in what is shown in the video information and what the game engine is identifying as present in the game environment. For example, a modified game engine may be used to hide or disguise power-ups or other in-game items using different geometries or textures applied thereto. In doing so, the playing user may gain the benefit of the items in the game engine while the items are not immediately obvious to a human moderator or spectator.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI 226. In other examples, a detected object that increases in size differently than the other objects in the game environment may be moving relative to the game environment.

A virtual object, as used herein, may include any object or element rendered or presented by the client device in the process of running the game application. For example, a virtual object may be an element of the UI 226. In some examples, a virtual object may be a player avatar 220. In some examples, the virtual object may be wall, floor, or other geometry of the game environment 222 such as a tree object 224. In some examples, the virtual object may be an interactive or movable object within the game environment, such as a door, crate, or power-up.

In some embodiments, the machine vision and/or ML model can identify objects in the game environment 222 without explicit training to identify the object. For example, a machine vision system that includes ML may learn to identify tree objects 224 within the game environment 222, even if the particular model of tree object 224 has not been explicitly taught to the machine vision system. In at least one example, systems and methods according to the present disclosure may be portable between video information from a variety of game applications where different models for common objects, such as tree object 224, are used. By training the ML model, the machine vision may be able to recognize and detect tree object 224 in the video information. In some examples, elements of the game environment are procedurally generated. A series of procedurally generated tree objects 224 may include common elements but be distinct models from one another, as rendered in the video information. Therefore, an explicitly provided model would be inapplicable to procedurally generated tree objects 224.

In some embodiments, the machine vision system invokes a module that is associated with the game application that is the source of the video information. Art styles can vary considerably between game applications. Even a ML model that has been trained on video information from a plurality of game applications to detect tree objects 224 may fail when presented with a new art style. For example, while both Fortnite and Call of Duty are competitive first-person shooter games, the appearance of objects is very different between the games. Specifically, tree objects 224 and other elements of the game environment 222 appear very different between the two game applications.

Systems and methods according to the present disclosure may access a ruleset that is associated with the game application that is the source of the video information. The ruleset may be generated by the ML model based on the game engine, may include predetermined or user-defined rules, or combinations of both. For example, the ruleset may include collision detection rules that are generated by training the ML model. FIG. 2-2 illustrates an example of collision failure in which the player avatar 220 clips through the tree object 224 identified in the frame of FIG. 2-1. The ML model may identify collision rules between a vehicle player avatar 220 and a tree object 224 that defines passing a vehicle player avatar 220 through the tree object 224 as impossible according to an unmodified game application. In some embodiments, the ruleset may include a predetermined explicit rule that passing a vehicle player avatar 220 through the tree object 224 is impossible according to an unmodified game application. In some embodiments, the ruleset includes user-defined rules that define passing a vehicle player avatar 220 through the tree object 224 is illegal according to the ruleset (e.g., of a tournament) despite the collision detection of the game application allowing the vehicle player avatar 220 to pass through the tree object 224. For example, some racing games include aesthetic elements off-track that do not include collision detection but driving through those objects to access shortcuts during a race may violate the rules of a competition.

As described herein, the ML model data may be stored remotely to the client device and/or the server computer and be accessed by the server computer as needed based on the video information or other information provided by the client device. In at least one embodiment, the ML model data is part of a module including game application-specific information for machine vision and/or rulesets.

Figure 3:
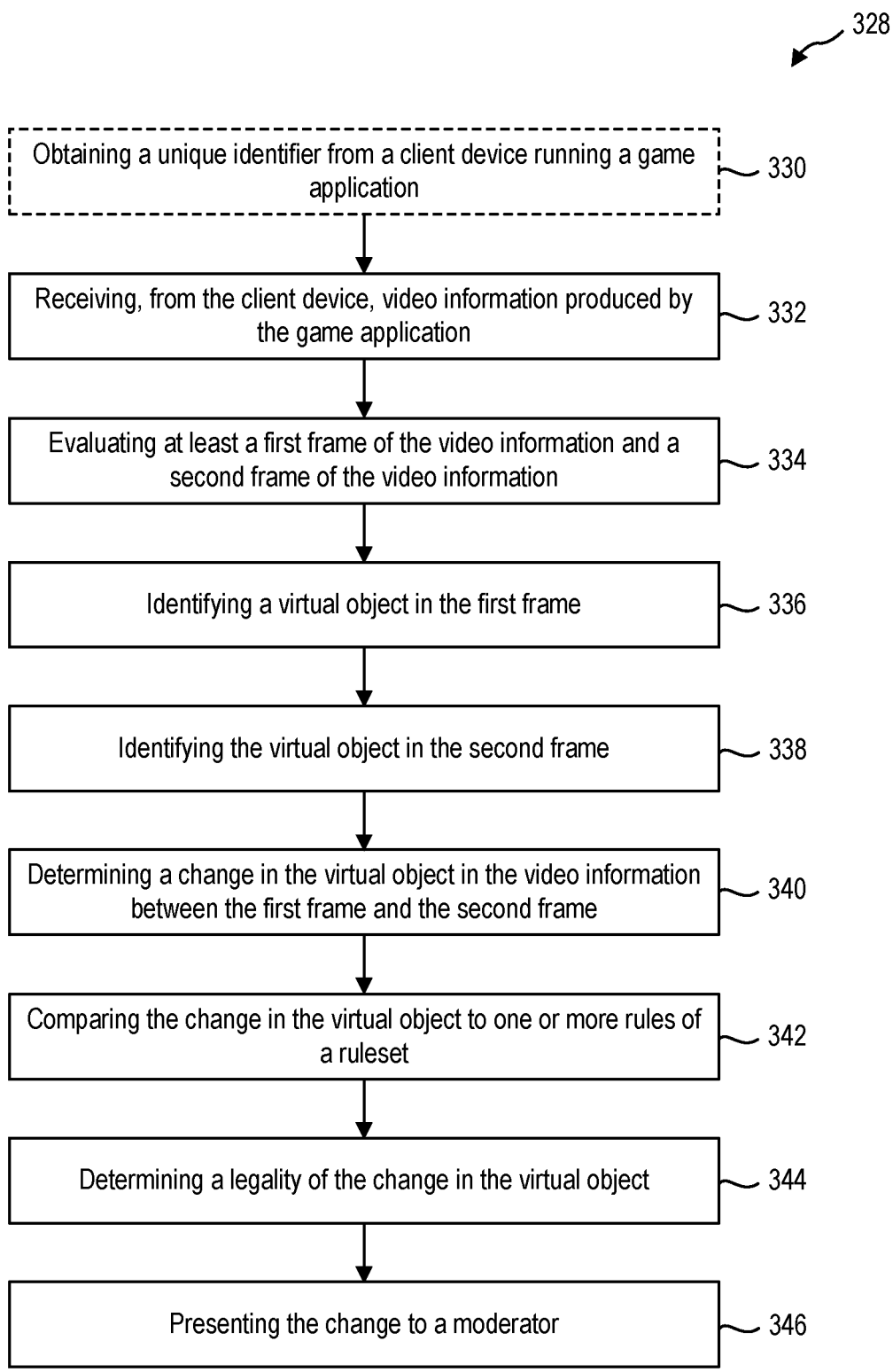
FIG. 3 is a flowchart illustrating a method of verifying the results of a competitive electronic game, according to at least some embodiments of the present disclosure.

In some embodiments, a method of verifying the events of an electronic game is performed at a server computer. FIG. 3 is a flowchart illustrating an embodiment of a method 328 according to the present disclosure. In some embodiments, the method can be performed on any source of video information from a game application, such as gameplay recordings, recreated renderings of a gameplay session based on game state data, or from live streams of the gameplay. In some embodiments, the method is used during a competition, such as an eSport tournament, and the method includes obtaining a unique identifier from a client device running a game application at 330 to ensure the source of the video information is positively verified. For example, a unique identifier may include a hardware identifier. A hardware identifier can include a media access control identifier (MAC ID) or another device ID. In some examples, a unique identifier may include a network identifier such as an internet protocol (IP) address. In some examples, a unique identifier may include a user account identifier. A user account identifier may be an online account username or ID number, or a user account identifier may be a unique pin code provided by a tournament organizer.

In some embodiments, the video information is obtained from a real-time (e.g., live) video stream or other screen sharing from the client device rendering the video information or otherwise running the game application. The video information collected from a real-time video stream may be considered a more reliable source of video information than a video recording, which may be modified, or a re-rendering of the game environment based on game state data alone. By obtaining the video information from real-time video streams, the source of the video information may be more easily verified using the unique identifier received at 330.

The method further includes evaluating at least a first frame of the video information and a second frame of the video information at 334 to identify a virtual object in the first frame at 336 and in the second frame at 338. After identifying the virtual object in the first frame and second frame, a change in the virtual object between the first frame and second frame is determined at 340.

The object detection may include any of the methods or techniques described herein to identify the virtual objects in the video information. The changes to the virtual object between the first frame and the second frame may be calculated based on changes relative to the game environment, or changes based on expected correlations.

Changes relative to the game environment may include events such as collision failures. For example, a virtual object passing through a detected surface without collision detection is a collision failure. In some examples, a collision failure includes a collision with no detected object, such as the player avatar running off the edge of a surface and continuing to run beyond the edge of the surface without any detected surface supporting the player avatar.

Other changes relative to the game environment include events such as a virtual object changing from the first frame to the second frame, which may indicate modification of the game application or use of a mod application that alters the game instance such as by changing a collectable resource into a different, more desirable resource.

Some changes in the virtual object relative to the game environment may include the appearance or disappearance of the virtual object in the game environment without a correlated action that would be expected with the appearance or disappearance of the virtual object. For example, a power-up may appear or an enemy may disappear seemingly spontaneously.

In some embodiments, the method includes comparing the change in the virtual object to one or more rules of a ruleset at 342. As described herein, the ruleset may be predetermined or may be generated by a ML system. In some embodiments, the ruleset includes and/or identifies impossible events (those disallowed by an unmodified game application), exploit events (known bugs that may be allowable depending on competition format), improbable events (probability-based events that exceed a threshold value), undesired events (events allowed by the game application that are selectively banned by the tournament format), or combinations thereof.

By comparing the event to the ruleset, a legality of the change in the virtual object may be determined at 344. In some embodiments, the method includes presenting the change in the virtual object to a moderator for review when the event violates the ruleset at 346.

In some embodiments, presenting the event to a moderator for review includes creating a discrete file with one or more frames of the video information for review by a moderator. For example, the discrete file may be a screen capture with the event highlighted by outline, border, or text notation. In some examples, the discrete file may be a video file including a portion of the video information. The video file may include video information before and after the detected illegal event. In some embodiments, presenting the event to a moderator for review may include timestamping or modifying the metadata of the video information (or creating a separate report including timestamps) for the moderator to directly review the original video information at the time of the illegal event.

In a particular example, systems and methods according to the present disclosure detect and report illegal or anomalous events during a competition or tournament that is officiated by one or more moderators. A result from each match or round during the competition is presented to a moderator for confirmation. Any illegal events may be reported to the moderator in the context of a match. The illegal event would contain information about which entrant in the match performed the illegal event and any necessary supporting evidence (e.g., still frame(s) or video(s) with timestamps). A report including a suspected illegal event notifies a moderator and flags the match for other moderators to easily find via filters of matches that require moderation.

In some embodiments, additional data is correlated against the detected events to supplement or verify the method described herein. In some embodiments, user inputs provided to the game application by the user are provided with the video information. In some embodiments, the user inputs are directional inputs or button inputs that instruct the game application to control the player avatar to move within or interact with the game environment or objects within the game environment. The user inputs can be compared against changes in the virtual objects in the video information to verify the integrity of the electronic game. For example, in a first-person shooter a common mod application is an aimbot that small adjustments in the user's aim without the user's input. An aimbot may ensure that any shots fired while the reticle is within a predetermined displacement of a target (such as another avatar) are corrected to hit the target. In some examples, the video information may indicate that the user's shots are striking a target that does not coincide with the aiming reticle. In some examples, the method described herein may detect a shift in the user's aim or perspective (in the video information) that does not correlate to a user input (in the user input data), indicating that an intervening mod provided a supplementary input to assist the player.

In some embodiments, the user input data may be further analyzed to detect macros or other electronic assistance in the gameplay. For example, a user input may be physically impossible based on the speed of the input or based on mechanical limitations of an input from a physical device. In a particular example, a gamepad or joystick is physically incapable of input simultaneous opposing directional inputs (e.g., left and right, simultaneously, or up and down, simultaneously). A user input that indicates physically impossible inputs may be presented to a moderator for review.

In a particular example, the comparison of the video information to a ruleset may trigger a supplemental review of the user input data. For example, some game applications, such as fighting games, require motion inputs to perform certain actions during gameplay. The motion inputs limit the movement of the player avatar at the time the detected action. For example, a motion input that requires holding backward for one second to launch a projectile prohibits the player avatar moving forward immediately prior to launching the projectile. In such an example, a comparison of the detected sequence of events (the player avatar moving forward and immediately launching a projectile) to the ruleset may identify that sequence of events as a potentially illegal event, and the method may include subsequently evaluating the user input data to check for illegal inputs.

In some embodiments, game state data provided by the client device is evaluated to verify the legality of suspected illegal event in the video information. For example, the video information may detect a change in the UI between frames reflecting an increase the player avatar's health points. An increase in the player avatar's health points may be, according to the ruleset, associated with interacting with a health pack virtual object. In the event that no health pack virtual object is detected in the video information, the method may include evaluating the game state data for the presence of a health pack object in the game environment, despite the health pack virtual object not appearing in the video information.

While some embodiments of systems and methods according to the present disclosure include a server computer receiving video information (and, optionally, other types of information) from a client device for evaluation, in some embodiments according to the present disclosure, systems and methods for verifying results of an electronic game use a server computer receiving information from a plurality of client devices to cross-correlate the information.

Figure 4:
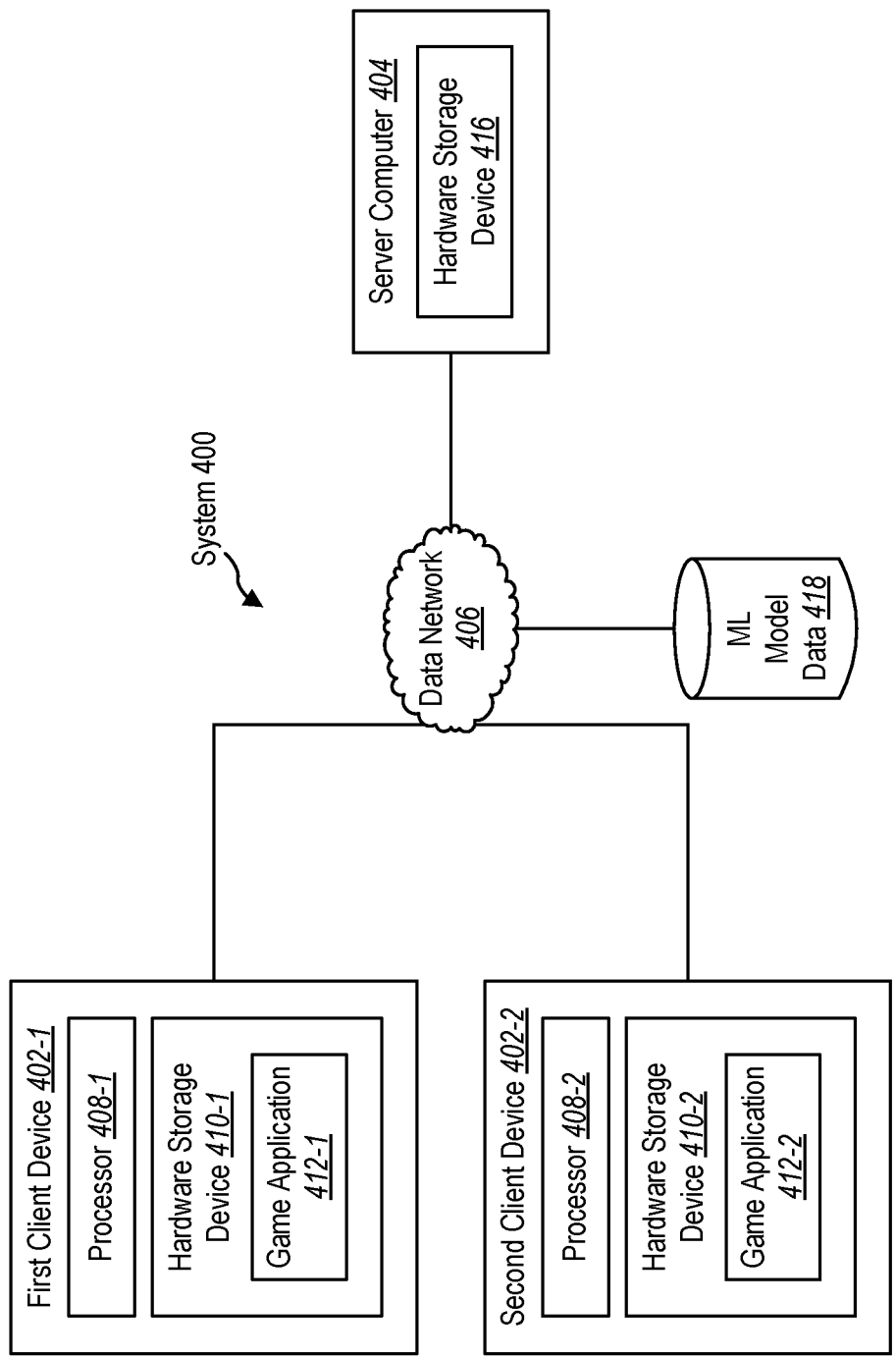
FIG. 4 is a schematic representation of another system for verifying the results of a competitive electronic game comparing video information from two client devices, according to at least some embodiments of the present disclosure.

FIG. 4 is a schematic illustration of a system 400 with multiple client devices 402-1, 402-2. In some embodiments, the system 400 includes a first client device and a second client device in data communication with a server computer. The first client device 402-1 and second client device 402-2 each have a processor 408-1, 408-2 and hardware storage device 410-1, 410-2 in communication with the processor 408-1, 408-2. In some embodiments, the hardware storage device is local to and/or integrated with the client device. In some embodiments, the hardware storage device is accessed by the client device through a network connection.

The processor 408-1, 408-2 may execute a game application 412-1, 412-2 that is stored on the hardware storage device 410-1, 410-2 to render video information at least partially in response to user inputs to the client device 402-1, 402-2. In some embodiments, the client device includes a display device to display the video information to a playing user. For example, the client device may be a dedicated gaming console with an integrated display or a general-purpose computer with an integrated display. In some embodiments, the client device is in communication with a display device to display the video information to a playing user.

In some embodiments, the video information, or portions of the video information, from each of the first client device 402-1 and the second client device 402-2 are also transmitted to a server computer 404 via a data network 406. In some embodiments, the server computer 404 is located remotely from the client device and the data network is or includes the World Wide Web. For example, the client device 402-1, 402-2 may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local network to which all client devices used for the competition are connected. A server connected to the local network may communicate with both the first client device and the second client device used for the competition.

Each client device executes a copy of the game application 412-1, 412-2 to generate the video information. In some embodiments, the client device 402-1, 402-2 renders the video information in real-time. In some embodiments, at least a portion of the video information is pre-rendered. The video information includes information about the game environment and the actions of the playing user. The first client device 402-1 is used by a first playing user, and the second client device 402-2 is used by a second playing user.

In at least one embodiment, a second client device 402-2 is also in data communication with the data network 406 and running a second copy of the game application 412-2. Each client device 402-1, 402-2 creates a separate game instance of the game applications, and the client devices communicate with one another to transmit game state data between the game instances. A game instance is a specific copy of a game application is that run by a client device, and the game instance may be interacted with while the game instance is active. In some examples, a first user may interact with a first instance of a game application and a second user may interact with a second instance of the same game application while the first instance and second instance are communicating with one another, such as a first user playing a first instance of Super Smash Bros. while a second user races against the first user in a second instance of Super Smash Bros. that is communicating with the first instance of Super Smash Bros. The shared information between the two game instances can allow the interactions of the first playing user with the first game instance to be reflected in the second game instance and vice versa. The representations of the game environment presented by the video information from the first client device 402-1 and the video information from the second client device 402-2 will match when the game applications are unmodified and no cheating is present.

The video information and/or game state data provided by the first client device 402-1 running a first game instance of the game application can be compared against that provided by the second client device 402-2 running a second game instance of the game application communicating with the first game instance to detect variations in the output of the devices. Variations may indicate that one or both of the client devices 402-1, 402-2 are running modified copies of the game application. Comparison of the output video information may identify non-malicious discrepancies that affect the results or integrity of a competition. In at least one example, problems with network communications or netcode can result in the first client device presenting a first game state and the second client device presenting a second game state before the netcode synchronizes are corrects. Such discrepancies in the game states experienced by users can adversely affect the gameplay and, hence, the results of the game.

In some embodiments, the server computer 404 receives the video information from the first client device 402-1 and the second client device 402-2 via the data network 406. The server computer includes a processor 414 and a hardware storage device 416 in data communication with the processor. The hardware storage device 416 has instructions stored thereon that, when executed by the processor, cause the server computer 404 to perform any of the methods described herein. For example, the server computer 404 may synchronize the video information such that an event in the video information from the first client device 402-1 occurs substantially simultaneously with the same event in the video information from the second client device 402-2.

In at least one embodiment, the server computer 404 includes or is in communication with a machine learning (ML) model that detects and/or reports events in the video information to evaluate the video information for illegal or undesired behaviors. In some embodiments, the server computer 404 has stored thereon (e.g., in the hardware storage device 416) a ML model that accesses and/or communicates with ML model data 418. In some examples, the ML model data 418 is stored locally to the server computer 404. In some examples, the ML model data 418 is stored remotely from the server computer 404 and accessed by the server computer 404 via the data network 406. For example, the ML model data 418 may be aggregated from and/or refined by a plurality of ML models executed by a plurality of server computers 404. The ML model data 418 may be updated based on the outputs of the ML models, with the most current ML model data 418 made available for the ML model running on the server computer 404 when needed.

Figure 5:
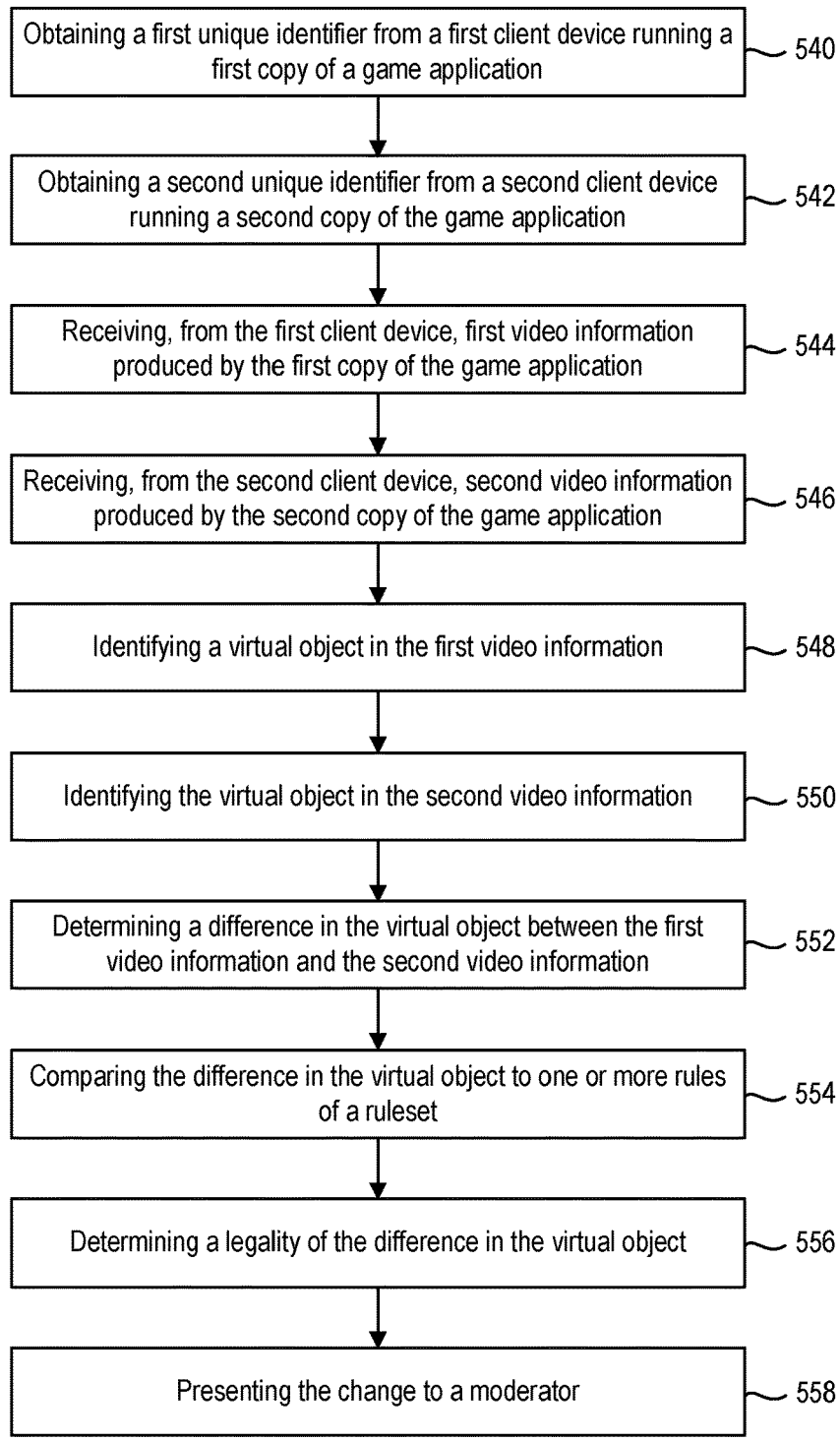
FIG. 5 is a flowchart illustrating another method of verifying the results of a competitive electronic game comparing video information from two client devices, according to at least some embodiments of the present disclosure.

FIG. 5 is a flowchart illustrating another embodiment of a method 548 of verifying the results of an electronic game. In some embodiments, the method 548 includes obtaining a first unique identifier from a first client device running a first copy of a game application at 540 and obtaining a second unique identifier from a second client device running a second copy of a game application at 542. The unique identifier may be any unique identifier described herein or combinations thereof. The server computer receives, from the first client device, first video information produced by the first copy of the game application at 544 and, from the second client device, second video information produced by the second copy of the game application at 546.

In some embodiments, the information received from the first client device and second client device includes a match ID, timestamp, or other identification that allows the server computer to correlate the first video information and the second video information. In some embodiments, the server computer may correlate the first video information and the second video information by comparing the first unique identifier and second unique identifier to a match list stored on or accessed by the server computer. For example, the server computer may compare the IP addresses of the client devices to a match list or compare user account information to the match list to confirm the first video information and the second video information relate to a competitive match involving the first client device and second client device.

The method further includes identifying a virtual object in the first video information at 548 and identifying the virtual object in the second video information at 550. For example, the virtual object may be the same virtual object presented from different perspectives. The virtual object may be a player avatar that, while the same player avatar, it viewed from different perspectives in the first video information and the second video information. In some embodiments, the different perspectives for the first video information and the second video information may allow a system or a moderator to identify the actions, movement, or location of the virtual object even when the virtual object is not detected in the first video information by correlating the actions, movement, or location of the virtual object in the second video information.

In some embodiments, the method includes determining a difference in the virtual object between the first video information and the second video information at 552 and comparing the difference in the virtual object to one or more rules of a ruleset at 554. As described herein, the ruleset may be generated through a ML system, be predetermined, or a combination thereof. A difference in the virtual object may be determined by comparing the location, movement, actions, or combinations thereof of the virtual objects identified in the first video information and the second video information. In at least one example, first game state data and second game state data may be further compared to determine whether the video information (e.g., the graphical presentation of the virtual objects) matches the location, movement, actions, or combinations thereof of the object as indicated by the game state data.

After comparing the difference in the virtual object to one or more rules of a ruleset, the method includes determining a legality of the difference in the virtual object 556. For example, some game applications allow a user to select the appearance of pickup or other items. In Streets of Rage 4, the appearance of health pickups is customizable in the game application. A difference in the appearance of the health pickups may be determined legal according to a ruleset for Streets of Rage 4. Conversely, the absence or modification of enemy sprites on screen between the first video information and the second video information may indicate that a client device is using a modified version of a game application.

In the event that a difference between the first video information and the second video information is determined to be illegal according to at least one rule of the ruleset, the difference event may be presented to a moderator for review at 558.

In some embodiments, presenting the event to a moderator for review includes creating a discrete file with one or more frames of the video information for review by a moderator. For example, the discrete file may be a screen capture with the event highlighted by outline, border, or text notation. In some examples, the discrete file may be a video file including a portion of the first video information, the second video information, or both. The video file may include video information before and after the detected illegal event. In some embodiments, presenting the event to a moderator for review may include timestamping or modifying the metadata of the video information (or creating a separate report including timestamps) for the moderator to directly review the original video information at the time of the illegal event.

In some embodiments, a method of verifying competitive electronic gaming results is performed at the client device or at a security device local to the client device, which then uploads the video information and/or event information to a data network. While the embodiment of a method will be described in relation to a discrete security device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a security device in communication with the client device may allow for additional computational resources local to the client device without compromising game performance.

Figure 6:
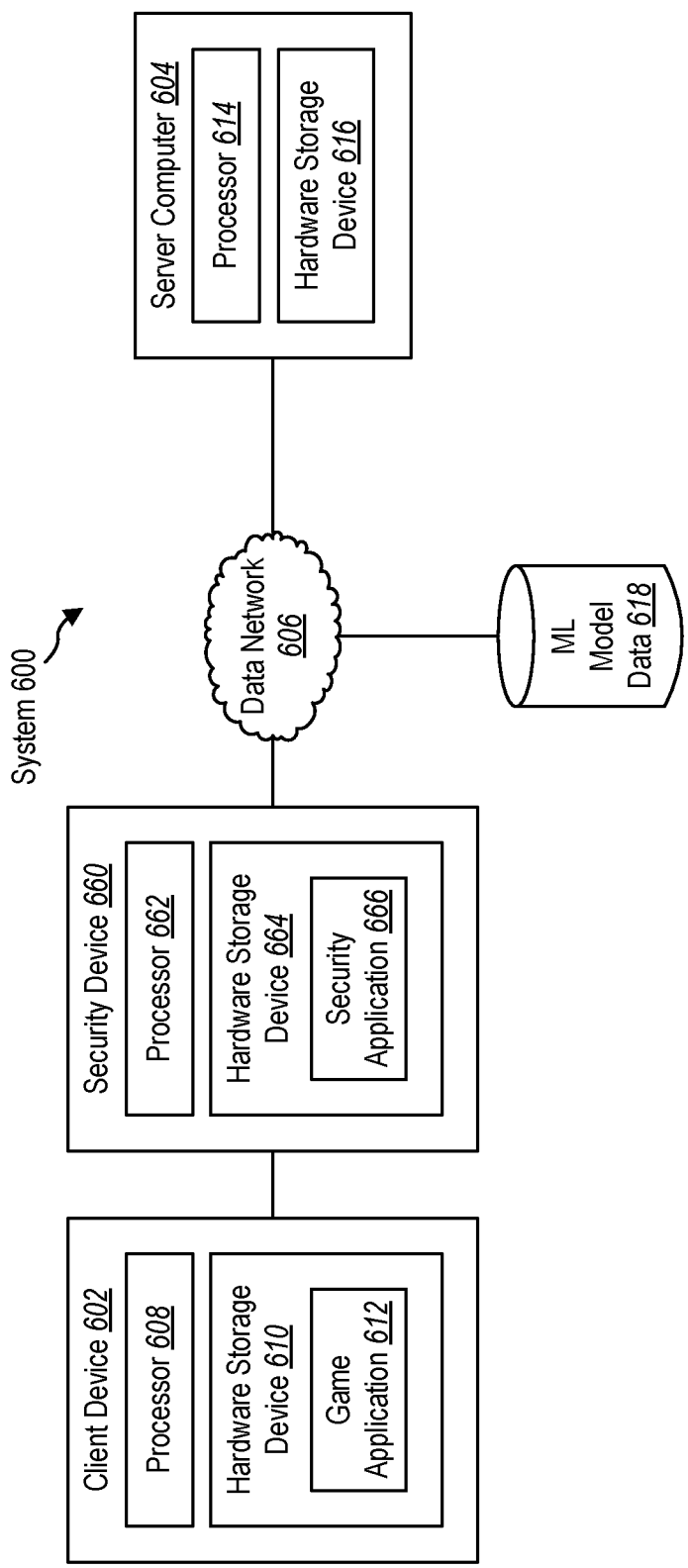
FIG. 6 is a schematic representation of yet another system for verifying the results of a competitive electronic game at or local to the client device, according to at least some embodiments of the present disclosure.

FIG. 6 is a schematic illustration of a system 600 including a security device 660 in communication with a client device 602 and a data network 606. A security device 660, in some embodiments, includes a hardware storage device 664 in communication with at least one processor 662. The client device 602 provides video information (and, optionally, user input data and/or game state data) to the security device 660. In some embodiments, the security device 660 is connected to a data network 606 to communicate with or access a remote server computer 604 and/or ML model data 618.

The security device 660 receives the video information from the client device 602 and evaluates the video information for anomalous or illegal events. In some embodiments, the security device 660 evaluates the video information according to any of the methods described herein.

Figure 7:
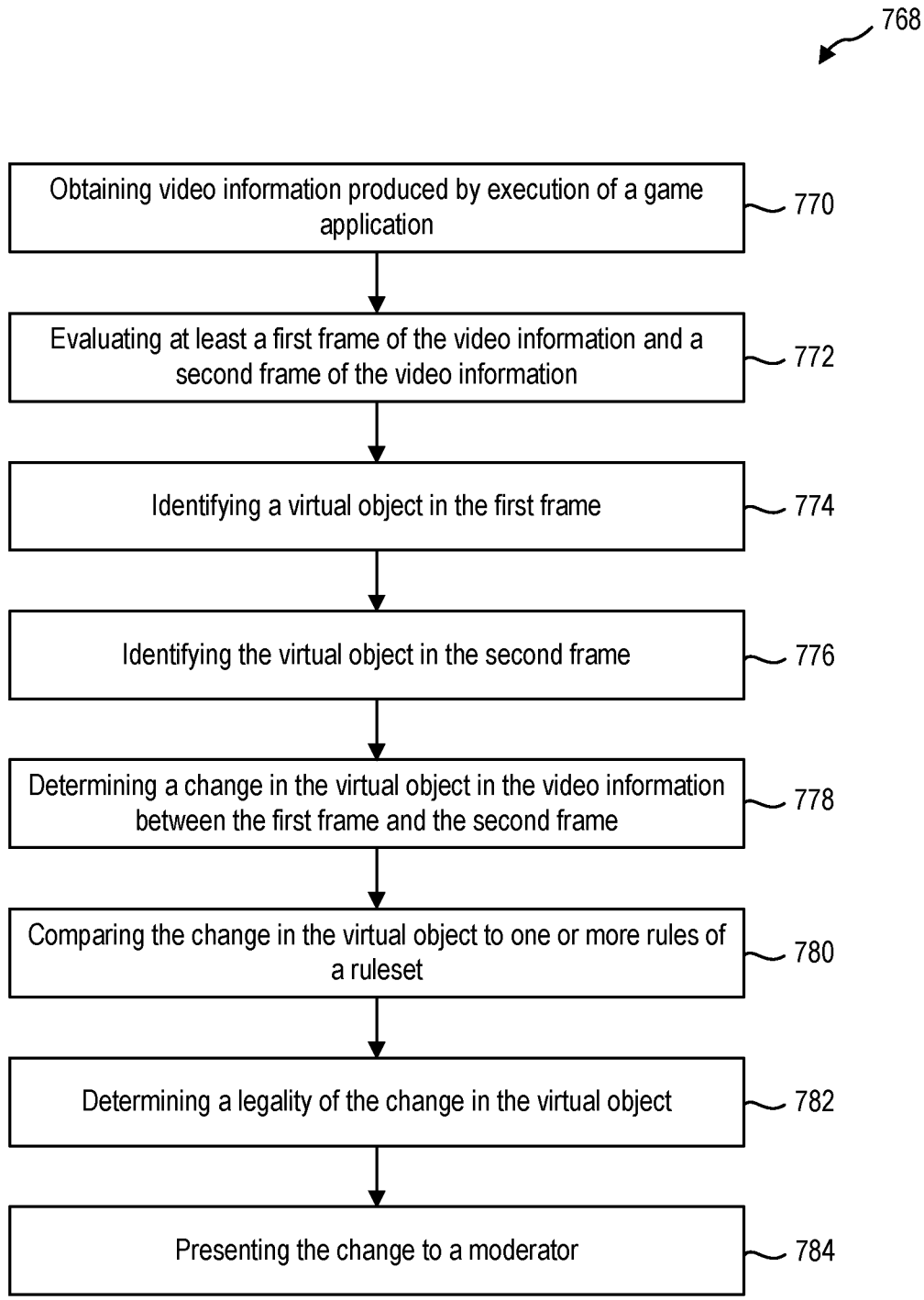
FIG. 7 is a flowchart illustrating a method of verifying the results of a competitive electronic game at or local to the client device, according to at least some embodiments of the present disclosure.

In some embodiments, the security device 660 or client device 602 obtains video information produced by execution of a game application 612 stored on a hardware storage device 610 by the processor 608 on the client device 602. In some embodiments, the video information is obtained by the client device 602 upon rendering the video information. Referring now to FIG. 7, in some embodiments, the video information is obtained by the security device by a local data connection to the client device or by the client device at 770. The method 768 further includes evaluating at least a first frame of the video information and a second frame of the video information at 772 to identify a virtual object in the first frame at 774 and in the second frame at 776.

A change in the virtual object between the first frame and second frame may be determined by any of the methods or techniques described herein at 778. For example, identifying the virtual object and determining a change in the virtual object may include any of the machine vision and/or ML techniques described herein. The method further includes comparing the change in the virtual object to one or more rules of a ruleset at 780.

In some embodiments, the ruleset is created by a machine learning system through training datasets. For example, a machine learning system may evaluate many events to determine correlations between events across many video streams or recordings. In some embodiments, the ruleset is a predetermined ruleset based on the game engine of the game application to inform the system what events are possible or impossible in the game engine. For example, the ruleset may indicate that a player avatar passing through a wall is not an allowed event in the game, which in turn indicates the player is cheating.

In some embodiments, the ruleset includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged.

In some embodiments, the ruleset includes probability tables that allow the detection of improbable events in the video information and/or game state data. For example, drop tables for a role-playing game may control the probability that a game engine provides a particular item to the player avatar in the game environment. If an item has a drop rate of 5.0%, a single detection of the item in the video information is non-anomalous. However, if the method or system described herein detects the item dropping 5 out of 20 chances (a 0.000000147% chance), the sequence may indicate a modified game engine and report the sequence of events to a moderator for review. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate an exploit in the game application. The ruleset may include threshold values to determine when to report an improbable event or sequence of events to a moderator for review. In some embodiments, a probability curve may be calculated based on the drop table or other probability table, and a threshold may be set at a standard deviation away from a most likely outcome. In another embodiment, the threshold may be set manually, such that a detected improbable event or sequence of events is reported when the occurrence exceeds the manually set threshold. As speedruns or other competitive submissions may exhibit a selection bias, moderators or officials setting the threshold may expect advantageous results to be submitted.

In some embodiments, the ruleset includes a predetermined set of undesired events that, while allowable by the game engine and intended to be in the game, have been deemed illegal for a particular competition. For example, certain player avatar skins (graphical appearances) may be banned from some competitions. In another example, some competitions may require certain graphical settings for the game application running on a client device, as a reduction in graphical settings may remove environmental objects, lighting effects, or particle effects that should be standardized for all players. In such examples, the ruleset may be predetermined by competition officials to ensure the events of the gameplay meet competition requirements.

After comparing the change in the virtual object to one or more rules, a legality of the change is determined at 782. If the change in the virtual object is determined to be illegal, the change is presented to a moderator for review according to any of the mechanisms described herein at 784.

INDUSTRIAL APPLICABILITY

The present disclosure relates generally to systems and methods for verifying the results of a competitive electronic game, either online or offline. Systems and methods described herein allow for automatic detection and reporting of cheats, exploits, data manipulation, rule violations, or other anomalous events in electronic gaming. For example, competitive games, such as eSports tournaments, may include anti-cheating measures in both software and human moderation, but some cheats may be sufficiently sophisticated that conventional moderation fails to identify the cheating or other undesired behavior. In some embodiments of systems and methods according to the present disclosure, video information is evaluated to detect objects and events using machine vision. The detected objects and events are then compared against a ruleset to determine the legality of the event.

In some embodiments, the ruleset is created by a machine learning system through training datasets. For example, a machine learning system may evaluate many events to determine correlations between events across many video streams or recordings. In some embodiments, the ruleset is a predetermined ruleset based on the game engine of the game application to inform the system what events are possible or impossible in the game engine. For example, the ruleset may indicate that a player avatar passing through a wall is not an allowed event in the game, which in turn indicates the player is cheating.

In some embodiments, the ruleset includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged.

In some embodiments, the ruleset includes probability tables that allow the detection of improbable events in the video information and/or game state data. For example, drop tables for a role-playing game may control the probability that a game engine provides a particular item to the player avatar in the game environment. If an item has a drop rate of 5.0%, a single detection of the item in the video information is non-anomalous. However, if the method or system described herein detects the item dropping 5 out of 20 chances (a 0.000000147% chance), the sequence may indicate a modified game engine and report the sequence of events to a moderator for review. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate an exploit in the game application. The ruleset may include threshold values to determine when to report an improbable event or sequence of events to a moderator for review. In some embodiments, a probability curve may be calculated based on the drop table or other probability table, and a threshold may be set at a standard deviation away from a most likely outcome. In another embodiment, the threshold may be set manually, such that a detected improbable event or sequence of events is reported when the occurrence exceeds the manually set threshold. As speedruns or other competitive submissions may exhibit a selection bias, moderators or officials setting the threshold may expect advantageous results to be submitted.

In some embodiments, the ruleset includes a predetermined set of undesired events that, while allowable by the game engine and intended to be in the game, have been deemed illegal for a particular competition. For example, certain player avatar skins (graphical appearances) may be banned from some competitions. In another example, some competitions may require certain graphical settings for the game application running on a client device, as a reduction in graphical settings may remove environmental objects, lighting effects, or particle effects that should be standardized for all players. In such examples, the ruleset may be predetermined by competition officials to ensure the events of the gameplay meet competition requirements.

In some embodiments, a system for verifying electronic gaming results includes a client device and a server computer in communication via a data network. In some embodiments, the client device is a computing device with a processor and hardware storage device in communication with the processor. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the computing device. In some embodiments, the hardware storage device is accessed by the computing device through a network connection.

The processor may execute a game application that is stored on the hardware storage device to render video information at least partially in response to user inputs to the client device. In some embodiments, the client device includes a display device to display the video information to a playing user. For example, the client device may be a dedicated gaming console with an integrated display (e.g., NINTENDO SWITCH) or a general-purpose computer with an integrated display (e.g., a laptop computer). In some embodiments, the client device is in communication with a display device to display the video information to a playing user. For example, the client device may be a gaming console (e.g., MICROSOFT XBOX) that outputs the video information to a connected display device (e.g., a television) for display to a playing user.

In some embodiments, the video information or a portion of the video information is also transmitted to a server computer via a data network. In some embodiments, the server computer is located remotely from the client device and the data network is or includes the World Wide Web. For example, the client device may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local network to which all client devices used for the competition are connected. A server connected to the local network may communicate with the client devices used for the competition.

The client device executes a copy of the game application to generate the video information. In some embodiments, the client device renders the video information in real-time. In some embodiments, at least a portion of the video information is pre-rendered. The video information includes information about the game environment and the actions of the playing user. By analyzing and evaluating the video information and/or game state data provided by the client device, the actions of the playing user and interactions of the playing user's avatar or player character in the game environment can be verified for integrity. The actions of the playing user and interactions of the playing user's avatar or player character in the game environment may be evaluated and compared against a ruleset to determine whether the playing user is adhering to pre-determined rules and/or whether the copy of the game application running on the client device has been modified. In some embodiments, one or more mod applications change inputs to or outputs from the game application, which may be detectable in the video information and/or game state data.

In at least one embodiment, a second client device is also in data communication with the data network and running a second copy of the game application. For example, both the first client device and the second client device may be running copies of Halo: Combat Evolved. A game instance is a specific copy of a game application is that run by a client device, and the game instance may be interacted with while the game instance is active. In some examples, multiple users may interact with a single instance of a game application, such as two user playing cooperatively in Streets of Rage 4. In some examples, a first user may interact with a first instance of a game application and a second user may interact with a second instance of the same game application, such as a first user playing a first instance of Minecraft on a first client device while a second user plays a second instance of Minecraft on a second client device that is independent of the first instance of Minecraft. In some examples, a first user may interact with a first instance of a game application and a second user may interact with a second instance of the same game application while the first instance and second instance are communicating with one another, such as a first user playing a first instance of Super Smash Bros. while a second user races against the first user in a second instance of Super Smash Bros. that is communicating with the first instance of Super Smash Bros.

The video information and/or game state data provided by the first client device running a first game instance of the game application can be compared against that provided by the second client device running a second game instance of the game application communicating with the first game instance to detect variations in the output of the devices. Variations may indicate that one or both of the client devices are running modified copies of the game application.

In some embodiments, the server computer receives the video information from the client device via the data network. The server computer includes a processor and a hardware storage device in data communication with the processor. The hardware storage device has instructions stored thereon that, when executed by the processor, cause the server computer to perform any of the methods described herein. For example, the server computer may detect events in the video information to evaluate the video information for illegal or undesired behaviors.

In at least one embodiment, the server computer includes or is in communication with a machine learning (ML) model that detects and/or reports events in the video information to evaluate the video information for illegal or undesired behaviors. In some embodiments, the server computer has stored thereon (e.g., in the hardware storage device) a ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model. In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, the UI element indicating player avatar health may increase in value in response to the player avatar interacting with a health pack in the game environment.

In some embodiments, the ML system can create a ruleset of expected or correlated events in the video information. In a particular example, if the UI element indicating player avatar health increases in value without the player avatar interacting with a health pack, the ML model may tag the event as anomalous healing of the player avatar and report the event to a moderator for review. In other examples, the ML model may correlate a collision event for a first-person shooter game application with the position of the reticle at or near the center of the screen. If the player is shooting and hitting targets not coinciding with the position of the reticle, the ML model may tag the event as anomalous aiming (and potential use of a mod application, such as an aimbot) and report the event to a moderator for review.

An instance may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information. In some embodiments, a training dataset includes drop tables.

In some embodiments, systems and methods described herein obtain a training dataset and identify one or more labels of the instances of the training dataset to predict anomalous events based on a comparison of detected events against a ruleset. In some embodiments, the ruleset is predetermined. In some embodiments, the ruleset is developed and refined by the ML system by iterations of processing video information.

Systems and methods according to the present disclosure parse the video information by detecting objects in frames of the video information. In some embodiments, the objects include virtual objects positioned in the game environment. The video information may reflect the player avatar moving within a three-dimensional or two-dimensional game environment, where the position of the virtual object is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar relative to the overall game environment and/or depending on the movement of the virtual object relative to the game environment.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state. In some embodiments, the game state data is used to synchronize two instances of a game application to render the same game environment to two different users. In some embodiments, the game state data can present the game state of the first instance asynchronously to a second instance to allow the same or different user to experience the game state of the first instance at a later time.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system. In some embodiments, the game state data may be compared against the object detection to check for discrepancies in what is shown in the video information and what the game engine is identifying as present in the game environment. For example, a modified game engine may be used to hide or disguise power-ups or other in-game items using different geometries or textures applied thereto. In doing so, the playing user may gain the benefit of the items in the game engine while the items are not immediately obvious to a human moderator or spectator.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI. In other examples, a detected object that increases in size differently than the other objects in the game environment may be moving relative to the game environment.

A virtual object, as used herein, may include any object or element rendered or presented by the client device in the process of running the game application. For example, a virtual object may be an element of the UI. In some examples, a virtual object may be a player avatar. In some examples, the virtual object may be wall, floor, or other geometry of the game environment. In some examples, the virtual object may be an interactive or movable object within the game environment, such as a door, crate, or power-up.

In some embodiments, the machine vision and/or ML model can identify objects in the game environment without explicit training to identify the object. For example, a machine vision system that includes ML may learn to identify trees within the game environment, even if the particular model of tree has not been explicitly taught to the machine vision system. In at least one example, systems and methods according to the present disclosure may be portable between video information from a variety of game applications where different models for common objects, such as trees, are used. By training the ML model, the machine vision may be able to recognize and detect tree objects in the video information. In some examples, elements of the game environment are procedurally generated. A series of procedurally generated trees may include common elements but be distinct models from one another, as rendered in the video information. Therefore, an explicitly provided model would be inapplicable to procedurally generated trees.

In some embodiments, the machine vision system invokes a module that is associated with the game application that is the source of the video information. Art styles can vary considerably between game applications. Even a ML model that has been trained on video information from a plurality of game applications to detect trees may fail when presented with a new art style. For example, while both Fortnite and Call of Duty are competitive first-person shooter games, the appearance of objects is very different between the games. Specifically, trees appear very different between the two game applications.

Systems and methods according to the present disclosure may access a ruleset that is associated with the game application that is the source of the video information. The ruleset may be generated by the ML model based on the game engine, may include predetermined or user-defined rules, or combinations of both. For example, the ruleset may include collision detection rules that are generated by training the ML model. The ML model may identify collision rules between a vehicle and a tree that defines passing a vehicle through a tree as impossible according to an unmodified game application. In some embodiments, the ruleset may include a predetermined explicit rule that passing a vehicle through a tree is impossible according to an unmodified game application. In some embodiments, the ruleset includes user-defined rules that define passing a vehicle through a tree is illegal according to the ruleset (e.g., of a tournament) despite the collision detection of the game application allowing the vehicle to pass through the tree. For example, some racing games include aesthetic elements off-track that do not include collision detection but driving through those objects to access shortcuts during a race may violate the rules of a competition.

As described herein, the ML model data may be stored remotely to the client device and/or the server computer and be accessed by the server computer as needed based on the video information or other information provided by the client device. In at least one embodiment, the ML model data is part of a module including game application-specific information for machine vision and/or rulesets.

In some embodiments, a method of verifying the events of an electronic game is performed at a server computer. In some embodiments, the method can be performed on any source of video information from a game application, such as gameplay recordings, recreated renderings of a gameplay session based on game state data, or from live streams of the gameplay. In some embodiments, the method is used during a competition, such as an eSport tournament, and the method includes obtaining a unique identifier from a client device running a game application to ensure the source of the video information is positively verified. For example, a unique identifier may include a hardware identifier. A hardware identifier can include a media access control identifier (MAC ID) or another device ID. In some examples, a unique identifier may include a network identifier such as an internet protocol (IP) address. In some examples, a unique identifier may include a user account identifier. A user account identifier may be an online account username or ID number, or a user account identifier may be a unique pin code provided by a tournament organizer.

In some embodiments, the video information is obtained from a real-time (e.g., live) video stream or other screen sharing from the client device rendering the video information or otherwise running the game application. The video information collected from a real-time video stream may be considered a more reliable source of video information than a video recording, which may be modified, or a re-rendering of the game environment based on game state data alone. By obtaining the video information from real-time video streams, the source of the video information may be more easily verified using the unique identifier received earlier.

The method further includes evaluating at least a first frame of the video information and a second frame of the video information to identify a virtual object in the first frame and in the second frame. After identifying the virtual object in the first frame and second frame, a change in the virtual object between the first frame and second frame is determined.

The object detection may include any of the methods or techniques described herein to identify the virtual objects in the video information. The changes to the virtual object between the first frame and the second frame may be calculated based on changes relative to the game environment, or changes based on expected correlations.

Changes relative to the game environment may include events such as collision failures. For example, a virtual object passing through a detected surface without collision detection is a collision failure. In some examples, a collision failure includes a collision with no detected object, such as the player avatar running off the edge of a surface and continuing to run beyond the edge of the surface without any detected surface supporting the player avatar.

Other changes relative to the game environment include events such as a virtual object changing from the first frame to the second frame, which may indicate modification of the game application or use of a mod application that alters the game instance such as by changing a collectable resource into a different, more desirable resource.

Some changes in the virtual object relative to the game environment may include the appearance or disappearance of the virtual object in the game environment without a correlated action that would be expected with the appearance or disappearance of the virtual object. For example, a power-up may appear or an enemy may disappear seemingly spontaneously.

In some embodiments, the method includes comparing the change in the virtual object to one or more rules of a ruleset. As described herein, the ruleset may be predetermined or may be generated by a ML system. In some embodiments, the ruleset includes and/or identifies impossible events (those disallowed by an unmodified game application), exploit events (known bugs that may be allowable depending on competition format), improbable events (probability-based events that exceed a threshold value), undesired events (events allowed by the game application that are selectively banned by the tournament format), or combinations thereof.

By comparing the event to the ruleset, a legality of the change in the virtual object may be determined. In some embodiments, the method includes presenting the change in the virtual object to a moderator for review when the event violates the ruleset.

In some embodiments, presenting the event to a moderator for review includes creating a discrete file with one or more frames of the video information for review by a moderator. For example, the discrete file may be a screen capture with the event highlighted by outline, border, or text notation. In some examples, the discrete file may be a video file including a portion of the video information. The video file may include video information before and after the detected illegal event. In some embodiments, presenting the event to a moderator for review may include timestamping or modifying the metadata of the video information (or creating a separate report including timestamps) for the moderator to directly review the original video information at the time of the illegal event.

In a particular example, systems and methods according to the present disclosure detect and report illegal or anomalous events during a competition or tournament that is officiated by one or more moderators. A result from each match or round during the competition is presented to a moderator for confirmation. Any illegal events may be reported to the moderator in the context of a match. The illegal event would contain information about which entrant in the match performed the illegal event and any necessary supporting evidence (e.g., still frame(s) or video(s) with timestamps). A report including a suspected illegal event notifies a moderator and flags the match for other moderators to easily find via filters of matches that require moderation.

In some embodiments, additional data is correlated against the detected events to supplement or verify the method described herein. In some embodiments, user inputs provided to the game application by the user are provided with the video information. In some embodiments, the user inputs are directional inputs or button inputs that instruct the game application to control the player avatar to move within or interact with the game environment or objects within the game environment. The user inputs can be compared against changes in the virtual objects in the video information to verify the integrity of the electronic game. For example, in a first-person shooter a common mod application is an aimbot that small adjustments in the user's aim without the user's input. An aimbot may ensure that any shots fired while the reticle is within a predetermined displacement of a target (such as another avatar) are corrected to hit the target. In some examples, the video information may indicate that the user's shots are striking a target that does not coincide with the aiming reticle. In some examples, the method described herein may detect a shift in the user's aim or perspective (in the video information) that does not correlate to a user input (in the user input data), indicating that an intervening mod provided a supplementary input to assist the player.

In some embodiments, the user input data may be further analyzed to detect macros or other electronic assistance in the gameplay. For example, a user input may be physically impossible based on the speed of the input or based on mechanical limitations of an input from a physical device. In a particular example, a gamepad or joystick is physically incapable of input simultaneous opposing directional inputs (e.g., left and right, simultaneously, or up and down, simultaneously). A user input that indicates physically impossible inputs may be presented to a moderator for review.

In a particular example, the comparison of the video information to a ruleset may trigger a supplemental review of the user input data. For example, some game applications, such as fighting games, require motion inputs to perform certain actions during gameplay. The motion inputs limit the movement of the player avatar at the time the detected action. For example, a motion input that requires holding backward for one second to launch a projectile prohibits the player avatar moving forward immediately prior to launching the projectile. In such an example, a comparison of the detected sequence of events (the player avatar moving forward and immediately launching a projectile) to the ruleset may identify that sequence of events as a potentially illegal event, and the method may include subsequently evaluating the user input data to check for illegal inputs.

In some embodiments, game state data provided by the client device is evaluated to verify the legality of suspected illegal event in the video information. For example, the video information may detect a change in the UI between frames reflecting an increase the player avatar's health points. An increase in the player avatar's health points may be, according to the ruleset, associated with interacting with a health pack virtual object. In the event that no health pack virtual object is detected in the video information, the method may include evaluating the game state data for the presence of a health pack object in the game environment, despite the health pack virtual object not appearing in the video information.

While some embodiments of systems and methods according to the present disclosure include a server computer receiving video information (and, optionally, other types of information) from a client device for evaluation, in some embodiments according to the present disclosure, systems and methods for verifying results of an electronic game use a server computer receiving information from a plurality of client devices to cross-correlate the information.

In some embodiments, a system includes a first client device and a second client device in data communication with a server computer. The first client device and second client device each have a processor and hardware storage device in communication with the processor. In some embodiments, the hardware storage device is local to and/or integrated with the computing device. In some embodiments, the hardware storage device is accessed by the computing device through a network connection.

The processor may execute a game application that is stored on the hardware storage device to render video information at least partially in response to user inputs to the client device. In some embodiments, the client device includes a display device to display the video information to a playing user. For example, the client device may be a dedicated gaming console with an integrated display or a general-purpose computer with an integrated display. In some embodiments, the client device is in communication with a display device to display the video information to a playing user.

In some embodiments, the video information, or portions of the video information from each of the first client device and the second client device are also transmitted to a server computer via a data network. In some embodiments, the server computer is located remotely from the client device and the data network is or includes the World Wide Web. For example, the client device may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local network to which all client devices used for the competition are connected. A server connected to the local network may communicate with both the first client device and the second client device used for the competition.

Each client device executes a copy of the game application to generate the video information. In some embodiments, the client device renders the video information in real-time. In some embodiments, at least a portion of the video information is pre-rendered. The video information includes information about the game environment and the actions of the playing user. The first client device is used by a first playing user, and the second client device is used by a second playing user.

In at least one embodiment, a second client device is also in data communication with the data network and running a second copy of the game application. Each client device creates a separate game instance of the game applications, and the client devices communicate with one another to transmit game state data between the game instances. A game instance is a specific copy of a game application is that run by a client device, and the game instance may be interacted with while the game instance is active. In some examples, a first user may interact with a first instance of a game application and a second user may interact with a second instance of the same game application while the first instance and second instance are communicating with one another, such as a first user playing a first instance of Super Smash Bros. while a second user races against the first user in a second instance of Super Smash Bros. that is communicating with the first instance of Super Smash Bros. The shared information between the two game instances can allow the interactions of the first playing user with the first game instance to be reflected in the second game instance and vice versa. The representations of the game environment presented by the video information from the first client device and the video information from the second client device will match when the game applications are unmodified and no cheating is present.

The video information and/or game state data provided by the first client device running a first game instance of the game application can be compared against that provided by the second client device running a second game instance of the game application communicating with the first game instance to detect variations in the output of the devices. Variations may indicate that one or both of the client devices are running modified copies of the game application. Comparison of the output video information may identify non-malicious discrepancies that affect the results or integrity of a competition. In at least one example, problems with network communications or netcode can result in the first client device presenting a first game state and the second client device presenting a second game state before the netcode synchronizes are corrects. Such discrepancies in the game states experienced by users can adversely affect the gameplay and, hence, the results of the game.

In some embodiments, the server computer receives the video information from the first client device and the second client device via the data network. The server computer includes a processor and a hardware storage device in data communication with the processor. The hardware storage device has instructions stored thereon that, when executed by the processor, cause the server computer to perform any of the methods described herein. For example, the server computer may synchronize the video information such that an event in the video information from the first client device occur substantially simultaneously with the same event in the video information from the second client device.

In at least one embodiment, the server computer includes or is in communication with a machine learning (ML) model that detects and/or reports events in the video information to evaluate the video information for illegal or undesired behaviors. In some embodiments, the server computer has stored thereon (e.g., in the hardware storage device) a ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

In some embodiments, a method of verifying online competitive gaming results includes obtaining a first unique identifier from a first client device running a first copy of a game application and obtaining a second unique identifier from a second client device running a second copy of a game application. The unique identifier may be any unique identifier described herein or combinations thereof. The server computer receives, from the first client device, first video information produced by the first copy of the game application and, from the second client device, second video information produced by the second copy of the game application.

In some embodiments, the information received from the first client device and second client device includes a match ID, timestamp, or other identification that allows the server computer to correlate the first video information and the second video information. In some embodiments, the server computer may correlate the first video information and the second video information by comparing the first unique identifier and second unique identifier to a match list stored on or accessed by the server computer. For example, the server computer may compare the IP addresses of the client devices to a match list or compare user account information to the match list to confirm the first video information and the second video information relate to a competitive match involving the first client device and second client device.

The method further includes identifying a virtual object in the first video information and identifying the virtual object in the second video information. For example, the virtual object may be the same virtual object presented from different perspectives. The virtual object may be a player avatar that, while the same player avatar, it viewed from different perspectives in the first video information and the second video information. In some embodiments, the different perspectives for the first video information and the second video information may allow a system or a moderator to identify the actions, movement, or location of the virtual object even when the virtual object is not detected in the first video information by correlating the actions, movement, or location of the virtual object in the second video information.

In some embodiments, the method includes determining a difference in the virtual object between the first video information and the second video information and comparing the difference in the virtual object to one or more rules of a ruleset. As described herein, the ruleset may be generated through a ML system, be predetermined, or a combination thereof. A difference in the virtual object may be determined by comparing the location, movement, actions, or combinations thereof of the virtual objects identified in the first video information and the second video information. In at least one example, first game state data and second game state data may be further compared to determine whether the video information (e.g., the graphical presentation of the virtual objects) matches the location, movement, actions, or combinations thereof of the object as indicated by the game state data.

After comparing the difference in the virtual object to one or more rules of a ruleset, the method includes determining a legality of the difference in the virtual object. For example, some game applications allow a user to select the appearance of pickup or other items. In Streets of Rage 4, the appearance of health pickups is customizable in the game application. A difference in the appearance of the health pickups may be determined legal according to a ruleset for Streets of Rage 4. Conversely, the absence or modification of enemy sprites on screen between the first video information and the second video information may indicate that a client device is using a modified version of a game application.

In the event that a difference between the first video information and the second video information is determined to be illegal according to at least one rule of the ruleset, the difference event may be presented to a moderator for review.

In some embodiments, presenting the event to a moderator for review includes creating a discrete file with one or more frames of the video information for review by a moderator. For example, the discrete file may be a screen capture with the event highlighted by outline, border, or text notation. In some examples, the discrete file may be a video file including a portion of the first video information, the second video information, or both. The video file may include video information before and after the detected illegal event. In some embodiments, presenting the event to a moderator for review may include timestamping or modifying the metadata of the video information (or creating a separate report including timestamps) for the moderator to directly review the original video information at the time of the illegal event.

In some embodiments, a method of verifying competitive electronic gaming results is performed at the client device or at a security device local to the client device, which then uploads the video information and/or event information to a data network. While the embodiment of a method will be described in relation to a discrete security device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a security device in communication with the client device may allow for additional computational resources local to the client device without compromising game performance.

A security device, in some embodiments, includes a hardware storage device in communication with at least one processor. The client device provides video information (and, optionally, user input data and/or game state data) to the security device. In some embodiments, the security device is connected to a data network to communicate with or access a remote server computer and/or ML model data.

The security device receives the video information from the client device and evaluates the video information for anomalous or illegal events. In some embodiments, the security device evaluates the video information according to any of the methods described herein.

In some embodiments, the security device or client device obtains video information produced by execution of a game application on the client device. In some embodiments, the video information is obtained by the client device upon rendering the video information. In some embodiments, the video information is obtained by the security device by a local data connection to the client device. The method further includes evaluating at least a first frame of the video information and a second frame of the video information to identify a virtual object in the first frame and in the second frame.

A change in the virtual object between the first frame and second frame may be determined by any of the methods or techniques described herein. For example, identifying the virtual object and determining a change in the virtual object may include any of the machine vision and/or ML techniques described herein. The method further includes comparing the change in the virtual object to one or more rules of a ruleset.

In some embodiments, the ruleset is created by a machine learning system through training datasets. For example, a machine learning system may evaluate many events to determine correlations between events across many video streams or recordings. In some embodiments, the ruleset is a predetermined ruleset based on the game engine of the game application to inform the system what events are possible or impossible in the game engine. For example, the ruleset may indicate that a player avatar passing through a wall is not an allowed event in the game, which in turn indicates the player is cheating.

In some embodiments, the ruleset includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged.

In some embodiments, the ruleset includes probability tables that allow the detection of improbable events in the video information and/or game state data. For example, drop tables for a role-playing game may control the probability that a game engine provides a particular item to the player avatar in the game environment. If an item has a drop rate of 5.0%, a single detection of the item in the video information is non-anomalous. However, if the method or system described herein detects the item dropping 5 out of 20 chances (a 0.000000147% chance), the sequence may indicate a modified game engine and report the sequence of events to a moderator for review. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate an exploit in the game application. The ruleset may include threshold values to determine when to report an improbable event or sequence of events to a moderator for review. In some embodiments, a probability curve may be calculated based on the drop table or other probability table, and a threshold may be set at a standard deviation away from a most likely outcome. In another embodiment, the threshold may be set manually, such that a detected improbable event or sequence of events is reported when the occurrence exceeds the manually set threshold. As speedruns or other competitive submissions may exhibit a selection bias, moderators or officials setting the threshold may expect advantageous results to be submitted.

In some embodiments, the ruleset includes a predetermined set of undesired events that, while allowable by the game engine and intended to be in the game, have been deemed illegal for a particular competition. For example, certain player avatar skins (graphical appearances) may be banned from some competitions. In another example, some competitions may require certain graphical settings for the game application running on a client device, as a reduction in graphical settings may remove environmental objects, lighting effects, or particle effects that should be standardized for all players. In such examples, the ruleset may be predetermined by competition officials to ensure the events of the gameplay meet competition requirements.

After comparing the change in the virtual object to one or more rules, a legality of the change is determined. If the change in the virtual object is determined to be illegal, the change is presented to a moderator for review.

Systems and methods according to the present disclosure provide an automated and intelligent monitoring of competitive electronic games through analysis of the video information. The system and methods provide broad monitoring as the analysis need not be done in real-time as the game is played. Analysis of the video information by the machine vision and ML systems described herein provide a first filter on gameplay review that can save time and energy for moderators and other officials of a competitive tournament.

The present disclosure relates to systems and methods for verifying the results of a competitive electronic game according to at least the examples provided in the sections below:

[A1] In some embodiments, a method, at a server computer (e.g., 330 of FIG. 3), for verifying the results of an electronic game includes obtaining (e.g., 106 of FIG. 1) a unique identifier from a client device (e.g., 102 of FIG. 1) running a game application (e.g., 112 of FIG. 1). The server computer then receives, from the client device, video information produced by the game application in a real-time video stream or another screen sharing protocol (e.g., 332 of FIG. 1). The video information is then evaluated (e.g., 334 of FIG. 1) at the server computer using machine vision and a machine learning model to identify a virtual object (e.g., player avatar 220, tree object 224, user interface 226 of FIG. 2-1) in a first frame of the video information (e.g., 336 of FIG. 1) and identify the virtual object in a second frame of the video information (e.g., 338 of FIG. 1). The method also includes determining a change in the virtual object between the first frame and the second frame (e.g., 340 of FIG. 1) and comparing the change to one or more rules of a ruleset (e.g., 342 of FIG. 1). The method includes determining a legality of the change in the virtual object based at least partially on the ruleset (e.g., 344 of FIG. 1). If an illegal or otherwise anomalous event is identified, the change is presented to a moderator for review (e.g., 346 of FIG. 1).

[A2] In some embodiments, the change in the virtual object described in [A1] is a movement of the virtual object relative to the game environment (e.g., 222 of FIG. 2-1).

[A3] In some embodiments, the change in the virtual object described in [A1] is a scaling of the virtual object relative to the game environment (e.g., 222 of FIG. 2-1).

[A4] In some embodiments, the change in the virtual object described in [A1] is a movement of the virtual object relative to the user perspective.

[A5] In some embodiments, the virtual object of any of [A1]-[A4] is part of a user interface (e.g., 226 of FIG. 2-1).

[A6] In some embodiments, the virtual object of any of [A1]-[A4] is a player avatar (e.g., 220 of FIG. 2-1).

[A7] In some embodiments, the unique identifier of any of [A1]-[A6] is a hardware identifier.

[A8] In some embodiments, the unique identifier of any of [A1]-[A6] is a network identifier.

[A9] In some embodiments, the unique identifier of any of [A1]-[A6] is a user account identifier.

[A10] In some embodiments, presenting the change to a moderator according to any of [A1]-[A9] includes modifying the video information for review by the moderator.

[A11] In some embodiments, presenting the change to a moderator according to any of [A1]-[A10] includes creating a discrete file for review by the moderator.

[A12] In some embodiments, the discrete file of [A11] is a video file including the identified change.

[A13] In some embodiments, the method described in any of [A1]-[A12] further includes receiving, from the client device, user inputs and comparing the user inputs to the change in the virtual object.

[A14] In some embodiments, the ruleset of any of [A1]-[A13] is based at least partially upon an unmodified game application.

[A15] In some embodiments, the ruleset of any of [A1]-[A14] is based at least partially upon user-defined game rules.

[B1] In some embodiments, a method of verifying online competitive electronic gaming results includes, at a server computer (e.g., 104 of FIG. 1), obtaining a first unique identifier from a first client device running a first copy of a game application (e.g., 540 of FIG. 5) and obtaining a second unique identifier from a second client device running a second copy of the game application (e.g., 542 of FIG. 5). The method further includes receiving, from the first client device, first video information produced by the first copy of the game application (e.g., 544 of FIG. 5) and receiving, from the second client device, second video information produced by the second copy of the game application (e.g., 546 of FIG. 5). The video information from each of the client devices can be compared by identifying a virtual object in the first video information (e.g., 548 of FIG. 5) and identifying the virtual object in the second video information (e.g., 550 of FIG. 5). A difference in the virtual object between the first video information and the second video information is determined (e.g., 552 of FIG. 5), and the difference is compared to one or more rules of a ruleset (e.g., 554 of FIG. 5). The method further includes determining a legality of the difference in the virtual object between the first video information and the second video information (e.g., 556 of FIG. 5), and, if an illegal or anomalous event is detected, the difference is presented to a moderator for review (e.g., 558 of FIG. 5).

[B2] In some embodiments, the first video information and second video information of [B1] present the virtual object from different perspectives.

In another aspect, some implementations include a system having memory and one or more processors. The system is configured perform any of the methods described herein, e.g., any of methods A1-A15 and B1-B2.

In yet another aspect, some implementations of the technology described herein include a computer-readable storage medium for storing computer-readable instructions. The computer-readable instructions, when executed by one or more hardware processors, perform any of the methods described herein, e.g., any of methods A1-A15 and B1-B2.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of verifying online competitive electronic gaming results, the method comprising:
    at a server computer:
        obtaining a unique identifier from a client device running a game application;
        receiving, from the client device, video information produced by the game application in a real-time video stream;
        evaluating at least a first frame of the video information and a second frame of the video information using a machine learning (ML) model to:
            identify a virtual object in the first frame, and
            identify the virtual object in the second frame;
        determining a change in the virtual object in the video information between the first frame and the second frame;
        comparing the change in the virtual object to one or more rules of a ruleset;
        determining a legality of the change in the virtual object; and
        presenting the change to a moderator for review using the unique identifier.

2. The method of claim 1, wherein the change in the virtual object is a movement of the virtual object relative to the game environment.

3. The method of claim 1, wherein the change in the virtual object is a scaling of the virtual object relative to the game environment.

4. The method of claim 1, wherein the change in the virtual object is a movement of the virtual object relative to the user perspective.

5. The method of claim 1, wherein the virtual object is part of a user interface.

6. The method of claim 1, wherein the virtual object is a player avatar.

7. The method of claim 1, wherein the unique identifier is a hardware identifier.

8. The method of claim 1, wherein the unique identifier is a network identifier.

9. The method of claim 1, wherein the unique identifier is a user account identifier.

10. The method of claim 1, wherein presenting the change to a moderator includes modifying metadata of the video information for review by the moderator.

11. The method of claim 1, wherein presenting the change to a moderator includes creating a discrete file for review by the moderator, wherein metadata of the discrete file includes information related to the change.

12. The method of claim 11, wherein the discrete file is a video file including the identified change.

13. The method of claim 1, further comprising:
    receiving, from the client device, user inputs; and
    comparing the user inputs to the change in the virtual object.

14. The method of claim 1, wherein the ruleset is based at least partially upon an unmodified game application.

15. The method of claim 1, wherein the ruleset is based at least partially upon user-defined game rules.

16. A method of verifying online competitive electronic gaming results, the method comprising:

at a server computer:
  obtaining a first unique identifier from a first client device running a first copy of a game application;
  obtaining a second unique identifier from a second client device running a second copy of the game application;
  receiving, from the first client device, first video information produced by the first copy of the game application;
  receiving, from the second client device, second video information produced by the second copy of the game application;
  identifying a virtual object in the first video information;
  identifying the virtual object in the second video information;
  determining a difference in the virtual object between the first video information and the second video information;
  comparing the difference in the virtual object to one or more rules of a ruleset;
  determining a legality of the difference in the virtual object; and
  presenting the difference to a moderator for review using the first unique identifier.

17. The method of claim 13, wherein the first video information and second video information present the virtual object from different perspectives.

18. A method of verifying online competitive electronic gaming results, the method comprising:
  obtaining video information produced by execution of a game application;
  evaluating at least a first frame of the video information and a second frame of the video information;
  identifying a virtual object in the first frame;
  determining a change in the virtual object in the video information between the first frame and the second frame;
  comparing the change in the virtual object to one or more rules of a ruleset;
  determining a legality of the change in the virtual object; and
  presenting the change to a moderator for review.

19. The method of claim 18, wherein obtaining the video information includes receiving the video information from a client device via a data network.

20. The method of claim 18, wherein obtaining the video information includes receiving the video information at a security device through a local data connection with the client device.

* * * * *